United States Patent Office 3,287,139
Patented Nov. 22, 1966

3,287,139
CODRIED LIQUID EGG WHITE-CARBOXYMETH-YLCELLULOSE COMPOSITION, PROCESS FOR THE PREPARATION THEREOF AND FOOD MIX UTILIZING SAME
Alexander J. Ganz, Wilmington, Del., assignor to Hercules Incorporated, a corporation of Delaware
No Drawing. Filed Mar. 5, 1964, Ser. No. 349,734
6 Claims. (Cl. 99—94)

This invention relates to codried egg white-carboxymethylcellulose having superior characteristics for use in bakery products, particularly in relation to forming, binding and stability properties and to a process for making said codried material.

For many years dried egg whites have been used as whipping agents and binders in the preparation of various bakery products. The dried egg whites may be incorporated into prepared backery mixes sold for use by commercial bakers and housewives or sold separately for use by the consumer in any desired manner. Examples of products prepared from bakery mixes incorporating dried egg whites include meringues, aerated frostings, angel food cakes and layer cakes.

It is of primary importance that the products prepared from such mixes containing dried egg whites compare favorably to products prepared from such mixes and liquid egg white. The initial properties of the products are necessarily of interest; however the stability or shelf life of the products is of equal importance to the success of such mixes, particularly those sold to commercial bakeries.

In the manufacture of meringues, aerated frostings and angel food cakes, it is important that dried egg whites have maximum foaming power, and that the resulting foam retain its initial volume. In the manufacture of layer cakes, the binding and stability properties of the dried egg whites are important.

While the products prepared from icing or cake mixes containing prior art dried egg white are reasonably satisfactory, their initial properties, and particularly the stability or shelf life of such products, are not as good as desired.

An object of this invention is to provide codried egg white-carboxymethylcellulose having superior characteristics for use in bakery products, particularly in relation to foaming, binding, and stability properties. Another object is to provide a proces for making such improved, codried egg white-carboxymethycellulose.

The above and other objects are accomplished according to this invention by carrying out the process which comprises substantially drying a mixture of liquid egg white and water-soluble carboxymethylcellulose.

Any water-soluble carboxymethylcellulose may be used in the present invention. Thus, all of the alkali metal salts and the ammonium salt of carboxymethylcellulose have been found to be suitable. However, the use of the sodium salt of carboxymethylcellulose (CMC) is preferred. In the specification, unless otherwise indicated, the terms "carboxymethylcellulose" and "CMC" are intended to include the alkali metal and ammonium salts of CMC. The CMC may be in solid or solution form when mixed with the liquid egg white.

The relative amount of CMC codried with liquid egg white may vary over a wide range and is not critical. Codried egg white-CMC containing 0.1%–25% CMC has been prepared in accordance with this invention and used successfully in the manufacture of various bakery products. The percent CMC in the codried egg white-CMC is based on the dry solid content of the liquid egg white. The viscosity of the CMC is not critical. Good results have been obtained in accordance with this invention with CMC having a viscosity of 25–2200 cps. Neither is the D.S. of the CMC critical so long as it is sufficiently high to be water soluble. It is well known in the art that for CMC to be substantially water soluble, the D.S. must be about 0.3 or greater. There are three hydroxyl groups in each anhydroglucose unit in the cellulose molecule. D.S., as used herein, means the average number of hydroxyl groups substituted in the cellulose per anhydroglucose unit.

The following examples illustrate the present invention but are not intended to limit the invention beyond the scope of the appended claims. Percent, parts, and ratios are by weight unless otherwise indicated. In the examples and elsewhere herein, the terms "CMC–A" and "CMC–B", respectively, mean CMC having a viscosity range and D.S. as given below; viscosity was measured on a 1% aqueous solution at 25° C. with a standard Brookfield Synchro-Lectric LVF viscometer.

| Type CMC | Viscosity range, cps. | D.S. |
|---|---|---|
| CMC–A | 25–50 | .65–.85 |
| CMC–B | 1,300–2,200 | .65–.85 |

Examples 1–8

In Examples 1–8, the following procedure was used in preparing the codried material. The CMC was added to the liquid egg white which contained 12.2% dry solids and which had been desugarized by the enzymatic method. Very slight mixing was employed during addition of the CMC. The liquid egg white-CMC mixture was adjusted to the desired pH by addition of hydrochloric acid. The resulting mixture was substantially dried by pan drying, Examples 1, 2, 5, 6, 7 and 8, and spray drying, Examples 3 and 4. The pan drying was carried out until the codried CMC-egg white product contained about 2% moisture. Spray drying was carried out at an air temperature of 165° F. and the codried CMC-egg white product contained 4% moisture.

Further details are shown in Table 1 hereinafter.

TABLE 1

| Example | Liquid Egg White, Parts | CMC | | Drying | | CMC in Codried Product, Percent |
|---|---|---|---|---|---|---|
| | | Type | Parts | pH | Temp., °F. | |
| 1 | 1,000 | CMC–A | 9.15 | 5.9 | 100 | 7.5 |
| 2 | 1,000 | CMC–B | 1.22 | 5.9 | 110 | 1.0 |
| 3 | 4,000 | CMC–A | 36.60 | 7.0 | 165 | 7.5 |
| 4 | 4,000 | CMC–B | 4.88 | 7.0 | 165 | 1.0 |
| 5 | 1,000 | CMC–B | 0.12 | 7.0 | 95 | 0.1 |
| 6 | 1,000 | CMC–B | 0.61 | 7.0 | 110 | 0.5 |
| 7 | 1,000 | CMC–A | 30.50 | 7.0 | 100 | 25.0 |
| 8 | 1,000 | CMC–B | 30.50 | 7.0 | 100 | 25.0 |

The codried products of Examples 1–8 were extremely water soluble and the CMC could not be separated from the dried egg whites by physical means. It is believed that the CMC when added to the liquid egg white and codried therewith, undergoes interaction with the proteins of the liquid egg white material. However, it is not intended to limit the present invention to any specific theory since the exact theory or mechanism is not completely understood.

Examples 9 and 10

Examples 9 and 10 illustrate the increased foaming power and improved stability of foams prepared with the codried CMC-egg white of this invention.

In Examples 9 and 10 foams were prepared by the following procedure, using codried egg white-CMC prepared in the manner described in Example 1. To 165 parts of water at 25° C. was added 16.5 parts of codried egg white-CMC. The solution was placed in a five-quart bowl of a Hobart N–50 mixer and whipped 1.5 minutes at medium speed and 1 minute at top speed using a balloon whip. The density of the resulting foam was measured. Fifty grams of the foam was carefully transferred to a 6-inch funnel equipped with a small piece of wire gauze at the apex to sustain the product. The funnel was inserted into a 100 ml. graduated cylinder and the elapsed time was noted for the first drop of water to pass from the funnel.

The foaming power and the stability of foams prepared from codried egg white-CMC, dried egg white alone and a physical blend of dried egg white-dry CMC were compared. The egg white was dried at the same pH and in the same manner as the respective codried egg white-CMC material. The dried egg white-dry CMC physical blend was prepared by mixing dry CMC and a portion of the egg white material dried alone. The dried egg white and the dried egg white-CMC physical blend were foamed in the same manner as the codried egg white-CMC and subjected to the same test. The results and further details are given in Table 2 hereinafter.

e.g., hydrochloric, citric and tartaric acids may be used to adjust the pH of the CMC-egg white mixture prior to drying.

Other well known desugarizing methods including, e.g., the bacterial and yeast methods may be used in the process of this invention in place of the enzymatic method of Examples 1–8. If desired conventional additives may be added to the mixture of liquid egg white and CMC before drying. For example they include those disclosed in U.S. Patent No. 2,637,654, namely unsulfonated water-soluble esters of tartaric, malic, malonic, citric and succinic acids.

The codried product of this invention has numerous uses, and the following examples illustrate some of these.

*Example 11*

This example illustrates the superior results obtained in an icing of the meringue type using the codried egg white-CMC of Example 1. 21.25 parts of codried egg white-CMC material (7.5% CMC-A) were dissolved in 148.75 parts of water at 25° C. The pH was adjusted to pH 5 with hydrochloric acid. This solution was placed in a five-quart Hobart N–50 mixing bowl and whipped 3 minutes at medium speed using a balloon whip. 116 parts sugar were added over a period of 30 seconds and whipping was continued for an additional 6.5 minutes

TABLE 2

| Example | Foaming Agent | Foaming Agent/Water Ratio | Drying | | Foam | | Time for First Drop (min.) |
|---|---|---|---|---|---|---|---|
| | | | pH | Temp. (° F.) | pH | Density (gm./cc.) | |
| 9 | (a) Dried Egg White | 1/10 | 5.9 | 100 | 5.9 | 0.15 | 1 |
| | (b) Blend of CMC-Dried Egg White [1] | 1/10 | 5.9 | 100 | 5.9 | 0.16 | 11 |
| | (c) Codried CMC-Egg White [1] | 1/10 | 5.9 | 100 | 5.9 | 0.14 | 22 |
| 10 | (a) Dried Egg White | 1/10 | 7.0 | 110 | 5.0 | 0.12 | 3 |
| | (b) Blend of CMC-Dried Egg White [1] | 1/10 | 7.0 | 110 | 5.0 | 0.15 | 10 |
| | (c) Codried CMC-Egg White [1] | 1/10 | 7.0 | 110 | 5.0 | 0.11 | 21 |

[1] 7.5% CMC-A.

Examples 9 and 10 show that the codried product of this invention produced a foam of substantially greater stability and volume than dried egg white alone, and also than a physical blend of dried egg white and dry CMC.

For a given use the amount of CMC required in the codried CMC-egg white of this invention varies inversely somewhat with the viscosity of the CMC. In general, the higher the viscosity of the CMC, the less that is required in the codried product to produce substantially the same results in a given end product as with a larger amount of a low viscosity CMC. Thus, for instance, under the conditions of Examples 9 and 10 comparable results are obtained by using an equal amount of codried CMC-egg white containing 1.0% CMC–B in place of the codried CMC-egg white containing 7.5% CMC–A.

Although pan and spray drying were used in the above examples, other types of drying may be used. These include, for example, oven drying, drum drying and freeze drying. The drying temperature is not critical, but one would use a temperature high enough to give an economical rate of drying and below that which would degrade the egg white material. When pan drying, oven drying or drum drying is used a temperature of about 120° F. should not be exceeded. When spray drying is used an air temperature of 180° F. may be employed without deleterious effects. The drying time is not important so long as the desired degree of drying is obtained. The degree of drying is likewise not critical and may vary widely, for example the codried material may contain 0.5%–15% water. The pH at which the CMC-egg white mixture is codried is not critical. It is conventional in the trade to dry egg whites at pH 7.5. Good results have been obtained in accordance with the present invention with codried egg white-CMC dried over a pH range of 5.0–7.5. Conventional materials including, at top speed. The meringue was then subjected to the same severe test as the foams of Examples 9 and 10. This meringue was of superior quality and texture, and after 24 hours under the test conditions of Examples 9 and 10 it had exuded only 16 ml. of water as compared to 30 ml. of water for a meringue prepared with 21.25 grams of dried egg white alone, and 20 ml. of water for a meringue prepared with 21.25 grams of dried egg white-dry CMC physical blend (7.5% CMC–A).

*Example 12*

An icing of the aerated frosting type was prepared from the following formula:

Ingredients: Percent
Codried CMC-egg white (7.5% CMC–A) ___ 1.96
Cream of tartar _____ 0.27
Salt _____ 0.10
Calcium tartrate _____ 0.10
Pregelatinized potato starch _____ 1.49
Corn syrup solids _____ 3.10
Gum stabilizer (CMC D.S. 0.7 viscosity, 1800 cps.) _____ 0.17
Icing sugar _____ 59.35
Powdered vanilla _____ 0.24
Water added _____ 33.22

The water was added to the dry mix and the resulting wet mixture was beat at high speed in a household Sunbeam mixer until stiff peaks were formed (3–5 minutes).

Icings were also prepared in accordance with the formula in this Example 12 except that an equal amount of dried egg white alone and a dry CMC-dried egg white blend, respectively, replaced the codried egg white-CMC of the formula. The icings were stored at 104° F. and 95% relative humidity. The results of these tests are given in Table 3. The lowest number indicates the best rating.

TABLE 3

| Egg White Material | Stability (Water Separation) | | Decorating Properties | |
|---|---|---|---|---|
| | 24 hr. | 72 hr. | 24 hr. | 72 hr. |
| Dried Egg White | 0 | 4 | Fair | Poor. |
| Blend of CMC-Dired Egg White [1] | 0 | 2 | ...do... | Fair. |
| Codried CMC-Egg White [1] | 0 | 1 | Good | Good. |

[1] 7.5% CMC-A.

The use of CMC as the gum stabilizer in the aerated frosting formula of Example 12 is not considered part of this invention. While it is preferred to use CMC as the gum stabilizer, others including guar gum, gum acacia and gum tragacanth may be used.

*Example 13*

Ingredients: Parts
Part I—
   Codried CMC-egg white
     (7.5% CMC-A) _____ 28.3
   Sugar _____ 53.0
   Monocalcium phosphate _____ 0.8
   Salt _____ 1.33
Part II—
   Sugar _____ 155.0
   Wheat starch _____ 10.9
   Cake flour _____ 60.0
   Monocalcium phosphate _____ 3.3
   Sodium bicarbonate _____ 0.97

Example 13 above illustrates an angel food cake dry mix of the type that may be sold in prepared form. In this example, Part I was added to 197 parts water at 25° C. in a five-quart mixing bowl of a Hobart N-50 mixer, wet out with a balloon whip and then whipped five minutes at second speed and 1 minute at top speed. Part II was sifted three times and added to the whipped mixture in three portions with fold-in. The final mix was baked for 35 minutes at 375° F. The resulting cake was characterized by improved volume, texture and tenderness. Furthermore, the resulting cake was characterized by a greater ability to retain these improvements upon storage as compared to cakes prepared from the above formula when 28.3 parts of dried egg white and 28.3 parts of dried egg white-dry CMC blend (7.5% CMC-A), respectively, were substituted for the codried egg white-CMC.

*Example 14*

Ingredients: Parts
   Cake flour _____ 228
   Sugar _____ 256
   Shortening _____ 63
   Salt _____ 5.7
   Baking powder _____ 12.5
   Codried CMC-egg white (7.5% CMC-A) ____ 8.7
   Milk added _____ 265

Example 14 above illustrates a white layer cake dry mix of the type that may be sold in prepared form. In this example, the dry ingredients were sifted, placed in a five-quart Hobart N-50 mixing bowl and mixed with the shortening for 15 minutes using a flat beater at low speed. The mixed ingredients were placed in a Kitchen Aid mixer and the milk was added in two portions with 2.5 minutes of mixing at medium speed after each addition. The batter was baked for 35 minutes at 360° F. The resulting white layer cake was characterized by increased volume, improved texture and a longer shelf life as compared with cakes from the above formula when an equal amount of dried egg white alone or dried egg white-dry CMC blend (7.5% CMC-A), respectively, replaced the codried egg white-CMC.

As stated hereinbefore, the amount of CMC which may be codried with liquid egg white is not critical and will vary with the system in which the codried product is used. When the codried CMC-egg white is used in foam systems, e.g. icings, frostings, and angel food cakes, preferably it will contain about 5%–10% of CMC-A with 7.5% being specifically preferred. When using CMC-B in the same system (i.e., foam system), preferably the amount of CMC will be about 0.1%–2% with 1% being specifically preferred. In non-foam systems such as layer cakes, the codried egg white-CMC preferably will contain 0.1%–25% CMC depending on the specific product in which it is used.

CMC-A and B, respectively, are presently available commercial products designated as Hercules' CMC-7LP and CMC-7HP.

Since it will be readily apparent to those skilled in this art that a number of variations may be made in this invention as described above within the spirit and scope thereof, it will be understood that the invention is not to be limited to the foregoing disclosure except as defined in the appended claims.

What I claim and desire to protect by Letters Patent is:

1. Process of preparing a new composition of matter comprising substantially drying a mixture of liquid egg white and carboxymethylcellulose.

2. Process of claim 1 wherein the mixture of liquid egg white and carboxymethylcellulose is dried by spray drying.

3. A new composition of matter comprising codried liquid egg white and carboxymethylcellulose.

4. A nonshortening cake composition comprising flour, sugar and codried egg white-carboxymethylcellulose.

5. A cake composition comprising flour, sugar, shortening and codried egg white-carboxymethylcellulose.

6. An icing composition comprising sugar and codried egg white-carboxymethylcellulose.

References Cited by the Examiner
UNITED STATES PATENTS

| 2,474,019 | 6/1949 | Steiner et al. | 99—139 |
| 2,496,278 | 2/1950 | Eddy | 99—206 |
| 2,802,741 | 8/1957 | Weaver et al. | 99—94 |
| 2,841,499 | 7/1958 | Grossi | 99—148 |
| 2,914,410 | 11/1959 | Butler | 99—139 |
| 2,981,629 | 4/1961 | Ginnette et al. | 99—210 |
| 3,023,104 | 2/1962 | Battista | 99—1 |
| 3,067,037 | 12/1962 | Herald et al. | 99—139 |
| 3,078,168 | 2/1963 | Bedenk | 99—94 |
| 3,093,488 | 6/1963 | Graham et al. | 99—199 |

A. LOUIS MONACELL, *Primary Examiner.*

RAYMOND N. JONES, *Examiner.*